(12) United States Patent
Sato

(10) Patent No.: US 12,395,600 B2
(45) Date of Patent: Aug. 19, 2025

(54) IMAGE PROCESSING APPARATUS, PRINTING APPARATUS, AND IMAGE PROCESSING METHOD FOR CONVERTING IMAGE DATA INTO DOT DATA

(71) Applicant: SEIKO EPSON CORPORATION, Tokyo (JP)

(72) Inventor: Hiroki Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/505,151

(22) Filed: Nov. 9, 2023

(65) Prior Publication Data

US 2024/0163389 A1   May 16, 2024

(30) Foreign Application Priority Data

Nov. 11, 2022  (JP) ................. 2022-180842

(51) Int. Cl.
*H04N 1/52* (2006.01)
*H04N 1/58* (2006.01)
*H04N 1/60* (2006.01)

(52) U.S. Cl.
CPC ............... *H04N 1/52* (2013.01); *H04N 1/58* (2013.01); *H04N 1/6008* (2013.01)

(58) Field of Classification Search
CPC ....... H04N 1/52; H04N 1/6008; H04N 1/4052
See application file for complete search history.

(56) References Cited

U.S. PATENT DOCUMENTS

| 7,050,194 | B1 | 5/2006 | Someno et al. | |
|---|---|---|---|---|
| 8,248,659 | B2* | 8/2012 | Gotoh | H04N 1/6022 358/3.06 |
| 11,769,023 | B2* | 9/2023 | Utsunomiya | H04N 1/4052 358/1.6 |
| 2008/0037068 | A1* | 2/2008 | Yokoyama | H04N 1/3871 358/2.1 |
| 2018/0036951 | A1* | 2/2018 | Harayama | H01L 21/67051 |

FOREIGN PATENT DOCUMENTS

JP     2005-137019 A     5/2005

* cited by examiner

*Primary Examiner* — Barbara D Reinier
(74) *Attorney, Agent, or Firm* — Global IP Counselors, LLP

(57) ABSTRACT

A total sum obtained by multiplying a distribution ratio set for each of distribution destination pixels by a relative position in a first direction is a first direction total sum, a total sum obtained by multiplying the distribution ratio set for each of the distribution destination pixels by a relative position in a second direction is a second direction total sum, a ratio of the second direction total sum to the first direction total sum is a total sum ratio, a ratio of a second direction resolution to a first direction resolution is a resolution ratio, the total sum ratio when the resolution ratio is a first resolution ratio is a first total sum ratio, when the resolution ratio is a second resolution ratio greater than the first resolution ratio is a second total sum ratio, and the second total sum ratio is greater than the first total sum ratio.

5 Claims, 11 Drawing Sheets

| Rx (dpi) | Ry (dpi) | Ry/Rx | IM0 |
|---|---|---|---|
| 2400 | 600 | 1/4 | |
| 1200 | 600 | 1/2 | |
| 600 | 600 | 1 | |
| 600 | 1200 | 2 | |
| 600 | 2400 | 4 | |

FIG. 4

$$Sx = \sum_{i=1}^{n}(Ri \times \Delta xi)$$

$$Sy = \sum_{i=1}^{n}(Ri \times \Delta yi)$$

IMAGE PROCESSING APPARATUS, PRINTING APPARATUS, AND IMAGE PROCESSING METHOD FOR CONVERTING IMAGE DATA INTO DOT DATA

The present application is based on, and claims priority from JP Application Serial Number 2022-180842, filed Nov. 11, 2022, the disclosure of which is hereby incorporated by reference herein in its entirety.

BACKGROUND

1. Technical Field

The present disclosure relates to an image processing apparatus capable of performing halftone processing by an error diffusion method, a printing apparatus and an image processing method.

2. Related Art

There is known an image processing apparatus that performs halftone processing for generating dot data representing a dot formation state by reducing the number of tones of multi-tone image data in order to form a print image. Halftone processing by an error diffusion method is known as a technique for obtaining high-quality output. JP 2005-137019 A discloses an image processing apparatus that performs the halftone processing by the error diffusion method.

In a print image, a resolution in a horizontal direction may be different from a resolution in a vertical direction. In this case, when the halftone processing by the error diffusion method is performed, a dot arrangement may be biased, and in particular, the bias may appear as a decrease in granularity in a low-tone portion in the image. Thus, in the halftone processing by the error diffusion method, there is room for improvement in terms of granularity.

SUMMARY

An image processing apparatus of the present disclosure is an image processing apparatus configured to convert image data in which a first direction resolution in a first direction and a second direction resolution in a second direction intersecting the first direction are set into dot data representing a dot formation state by an error diffusion method, the image processing apparatus including an aspect including
  a conversion unit configured to determine the dot formation state based on a pixel value and a distributed error in a conversion target pixel included in a plurality of pixels constituting the image data, and
  a diffusion unit configured to diffuse an error generated in the conversion target pixel, in accordance with a distribution ratio set for each of a plurality of distribution destination pixels that are not converted, to the plurality of distribution destination pixels wherein
  a total sum obtained by multiplying the distribution ratio set for each of the distribution destination pixels by a relative position of the distribution destination pixel in the first direction with respect to the conversion target pixel is a first direction total sum, and the first direction total sum is not 0,
  a total sum obtained by multiplying the distribution ratio set for each of the distribution destination pixels by a relative position of the distribution destination pixel in the second direction with respect to the conversion target pixel is a second direction total sum, and the second direction total sum is not 0,
  a ratio of the second direction total sum to the first direction total sum is a total sum ratio,
  a ratio of the second direction resolution to the first direction resolution is a resolution ratio,
  the total sum ratio when the resolution ratio is a first resolution ratio is a first total sum ratio,
  the total sum ratio when the resolution ratio is a second resolution ratio greater than the first resolution ratio is a second total sum ratio, and
  each of the distribution ratios is set for the distribution destination pixel so that the second total sum ratio is greater than the first total sum ratio.

Further, a printing apparatus of the present disclosure includes an aspect including
  the image processing apparatus, and
  a printing unit configured to form a print image having the first direction resolution in the first direction and the second direction resolution in the second direction on a medium in accordance with the dot data.

Further, an image processing method of the present disclosure is an image processing method of converting image data in which a first direction resolution in a first direction and a second direction resolution in a second direction intersecting the first direction are set into dot data representing a dot formation state by an error diffusion method, the image processing method including an aspect including
  a conversion step for determining the dot formation state based on a pixel value and a distributed error in a conversion target pixel included in a plurality of pixels constituting the image data, and
  a diffusion step for diffusing an error generated in the conversion target pixel, in accordance with a distribution ratio set for each of a plurality of distribution destination pixels that are not converted, to the plurality of distribution destination pixels wherein
  a total sum obtained by multiplying the distribution ratio set for each of the distribution destination pixels by a relative position of the distribution destination pixel in the first direction with respect to the conversion target pixel is a first direction total sum, and the first direction total sum is not 0,
  a total sum obtained by multiplying the distribution ratio set for each of the distribution destination pixels by a relative position of the distribution destination pixel in the second direction with respect to the conversion target pixel is a second direction total sum, and the second direction total sum is not 0,
  a ratio of the second direction total sum to the first direction total sum is a total sum ratio,
  a ratio of the second direction resolution to the first direction resolution is a resolution ratio,
  the total sum ratio when the resolution ratio is a first resolution ratio is a first total sum ratio,
  the total sum ratio when the resolution ratio is a second resolution ratio greater than the first resolution ratio is a second total sum ratio, and
  each the distribution ratios is set for the distribution destination pixel so that the second total sum ratio is greater than the first total sum ratio.

BRIEF DESCRIPTION OF THE DRAWINGS

FIG. 4 is a diagram schematically illustrating an example of resolutions of a print image.

DESCRIPTION OF EMBODIMENTS

Figure 1:
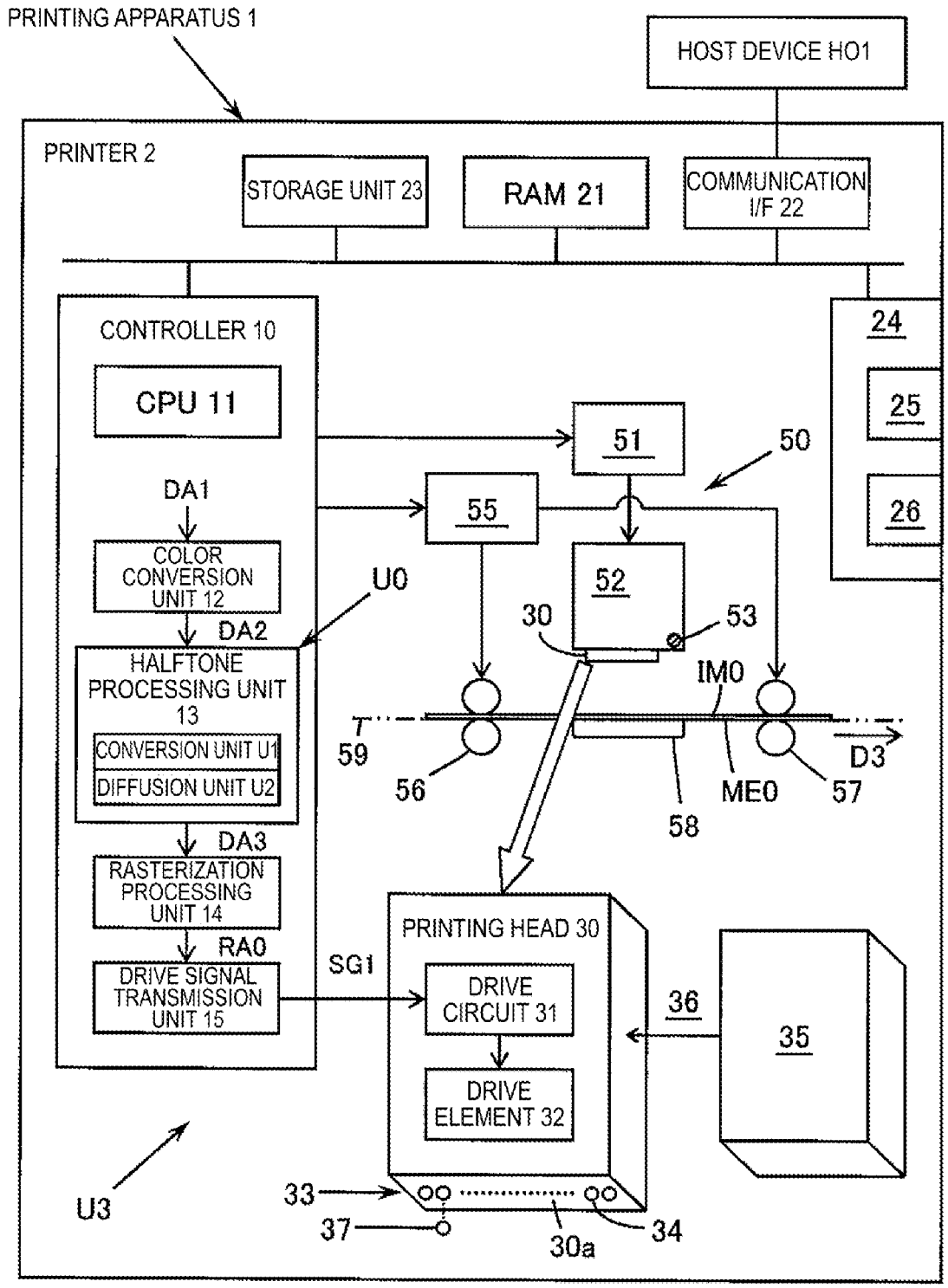
FIG. 1 is a diagram schematically illustrating an example of an image processing apparatus.

Embodiments of the present disclosure will be described. Of course, the following embodiments only illustrate the present disclosure, and not all features illustrated in the embodiments are indispensable for the solution of the disclosure.

(1) Overview of Technology Included in Present Disclosure

First of all, an overview of technique included in the present disclosure will be described with reference to examples illustrated in FIG. 1 to FIG. 11. Note that the drawings of the present application schematically illustrate the examples, that an enlargement factor in each direction illustrated in each drawing may vary among the drawings, and that the drawings may not be consistent with one another. Of course, the elements of the technology are not limited to specific examples illustrated with reference numerals. Note that in the section "Overview of technology included in present disclosure", a word included in parentheses is for supplementary description of the immediately preceding word.

Aspect 1

Figure 3:
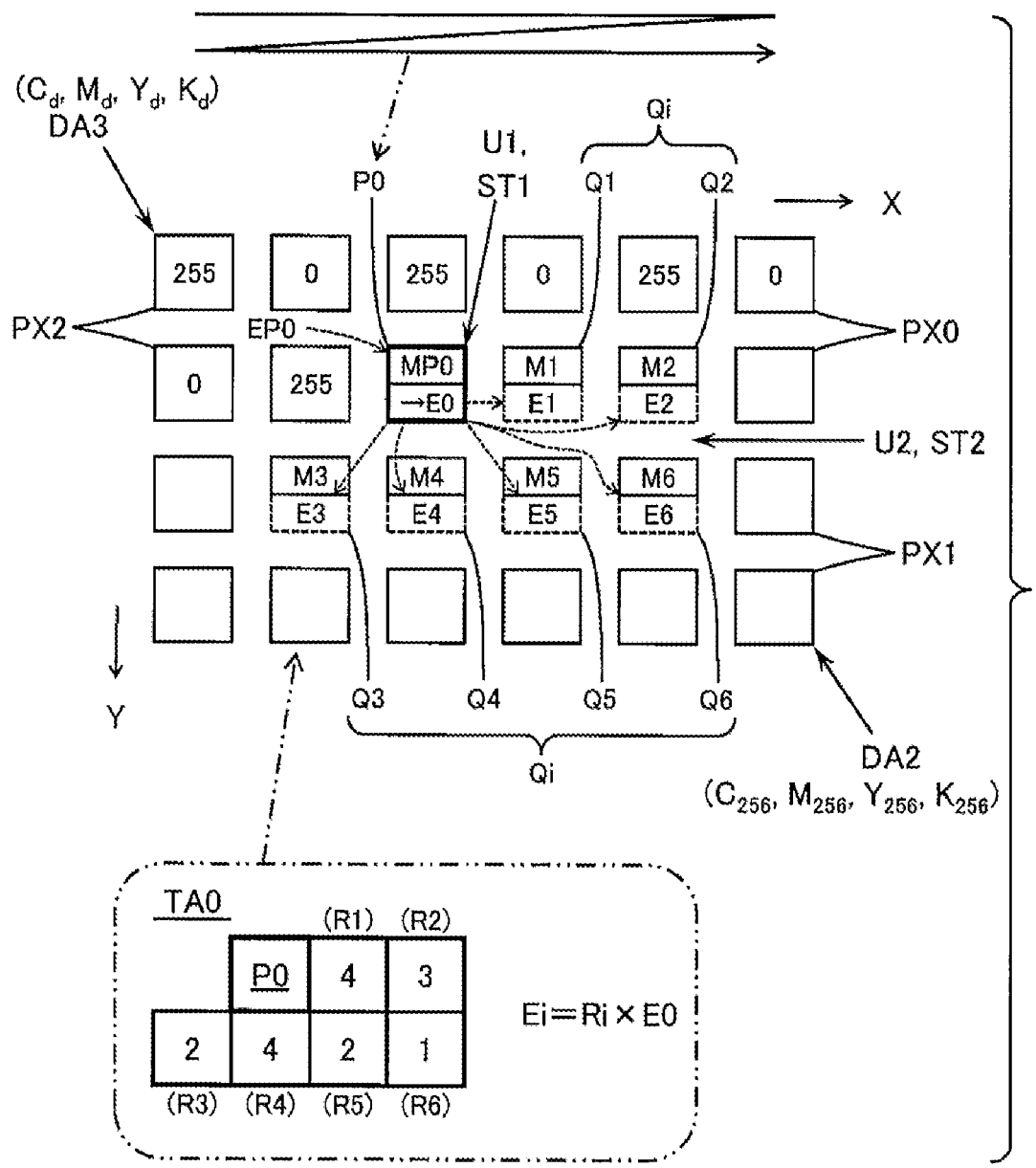
FIG. 3 is a diagram schematically illustrating an example of halftone processing by an error diffusion method.
Figure 5:
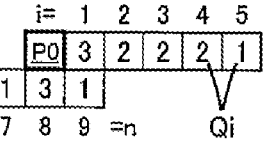
FIG. 5 is a diagram schematically illustrating an example of distribution ratio tables in accordance with resolution ratios.
Figure 9:
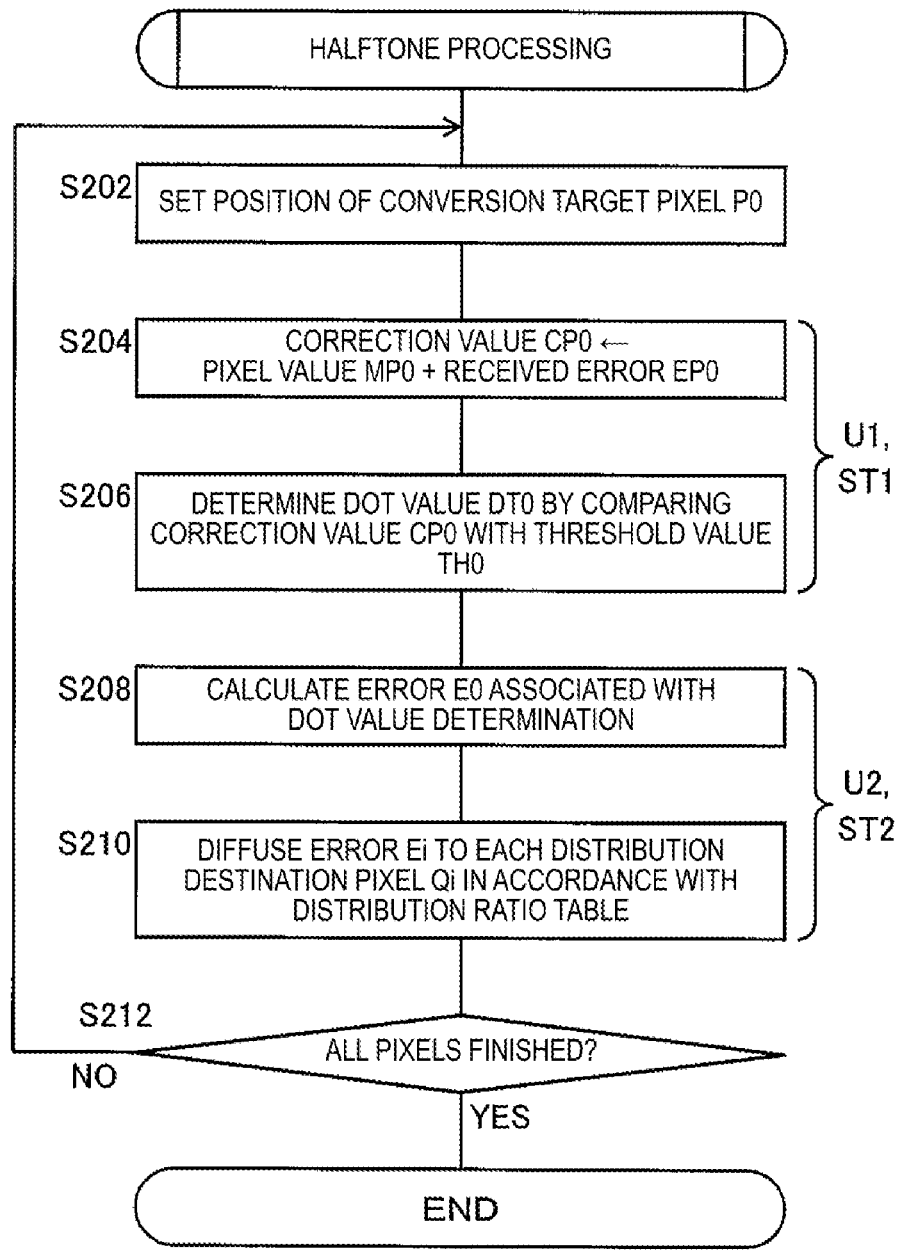
FIG. 9 is a flowchart schematically illustrating an example of halftone processing.

As illustrated in FIGS. 1, 3 and 9, an image processing apparatus U0 according to an aspect of the present technology is the image processing apparatus U0 capable of converting image data (for example, ink amount data DA2) in which a first direction resolution (for example, a resolution Rx) in a first direction (for example, an X direction) and a second direction resolution (for example, a resolution Ry) in a second direction (for example, a Y direction) intersecting the first direction into dot data DA3 representing a formation state of a dot 38 by an error diffusion method, and includes a conversion unit U1 and a diffusion unit U2. The conversion unit U1 determines the formation state of the dot 38 based on a pixel value MP0 and a distributed error EP0 in a conversion target pixel P0 included in a plurality of pixels PX0 constituting the image data (DA2). The diffusion unit U2 diffuses an error E0 generated in the conversion target pixel P0, in accordance with a distribution ratio Ri set for each of a plurality of distribution destination pixels Qi that are not converted, to the plurality of distribution destination pixels Qi. Here, as illustrated in FIGS. 4 and 5, a total sum obtained by multiplying the distribution ratio Ri set for each of the distribution destination pixels Qi by a relative position (for example, Δxi) of the distribution destination pixel Qi in the first direction with respect to the conversion target pixel P0 is a first direction total sum (for example, a total sum Sx) that is not 0, a total sum obtained by multiplying the distribution ratio Ri set for each of the distribution destination pixels Qi by a relative position (for example, Δyi) of the distribution destination pixel Qi in the second direction with respect to the conversion target pixel P0 is a second direction total sum (for example, a total sum Sy) that is not 0, a ratio of the second direction total sum (Sy) to the first direction total sum (Sx) is a total sum ratio (for example Sy/Sx), a ratio of the second direction resolution (Ry) to the first direction resolution (Rx) is a resolution ratio (for example Ry/Rx), the total sum ratio (Sy/Sx) when the resolution ratio (Ry/Rx) is a first resolution ratio RR1 is a first total sum ratio SR1, and the total sum ratio (Sy/Sx) when the resolution ratio (Ry/Rx) is a second resolution ratio RR2 greater than the first resolution ratio RR1 is a second total sum ratio SR2. Each of the distribution ratios Ri is set for the distribution destination pixel Qi so that the second total sum ratio SR2 is greater than the first total sum ratio SR1.

As described above, the dot data DA3 in which the dots 38 are arranged so as to be more evenly dispersed in accordance with the resolution ratio (Ry/Rx) of an image is generated. Therefore, the above aspect can provide an image processing apparatus that contributes to improvement in granularity in accordance with a resolution ratio of an image.

In the present application, "first", "second", . . . are terms for distinguishing components included in a plurality of components having similarities, and do not indicate an order. Which components among the plurality of components "first", "second", . . . are applied to is relatively determined. For example, when a plurality of pixels of image data are arranged in the X direction and the Y direction, the Y direction corresponds to the second direction when the X direction corresponds to the first direction, and the X direction corresponds to the second direction when the Y direction corresponds to the first direction.

The dot data may be binary data indicating whether a dot is formed, or may be data indicating three values or more including a size of the dot.

Note that the description above also applies to the following aspects.

Aspect 2

Figure 6:
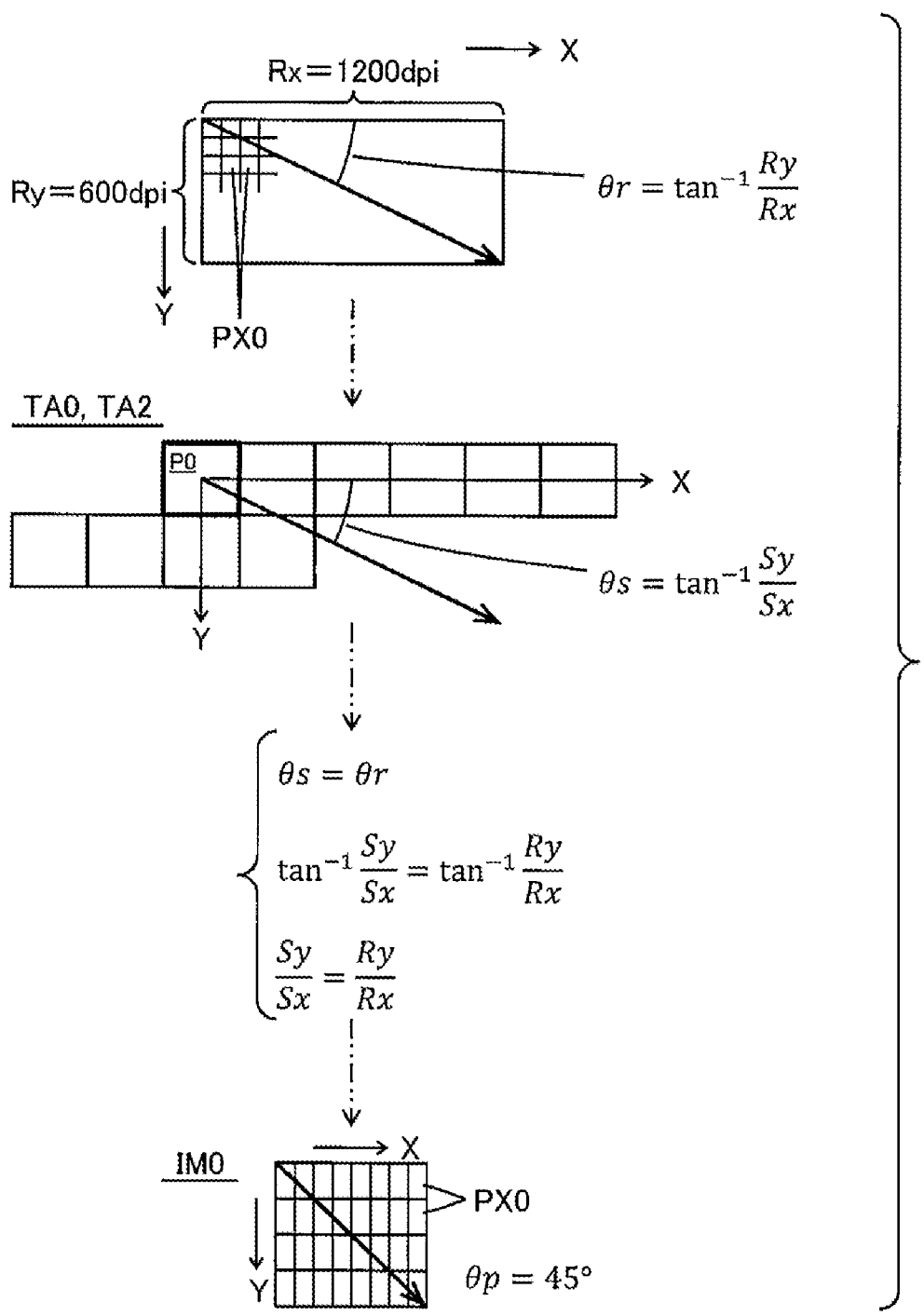
FIG. 6 is a diagram schematically illustrating an example in which an angle θs calculated from the distribution ratio table is matched with an angle θr based on a resolution ratio Ry/Rx.
Figure 7:
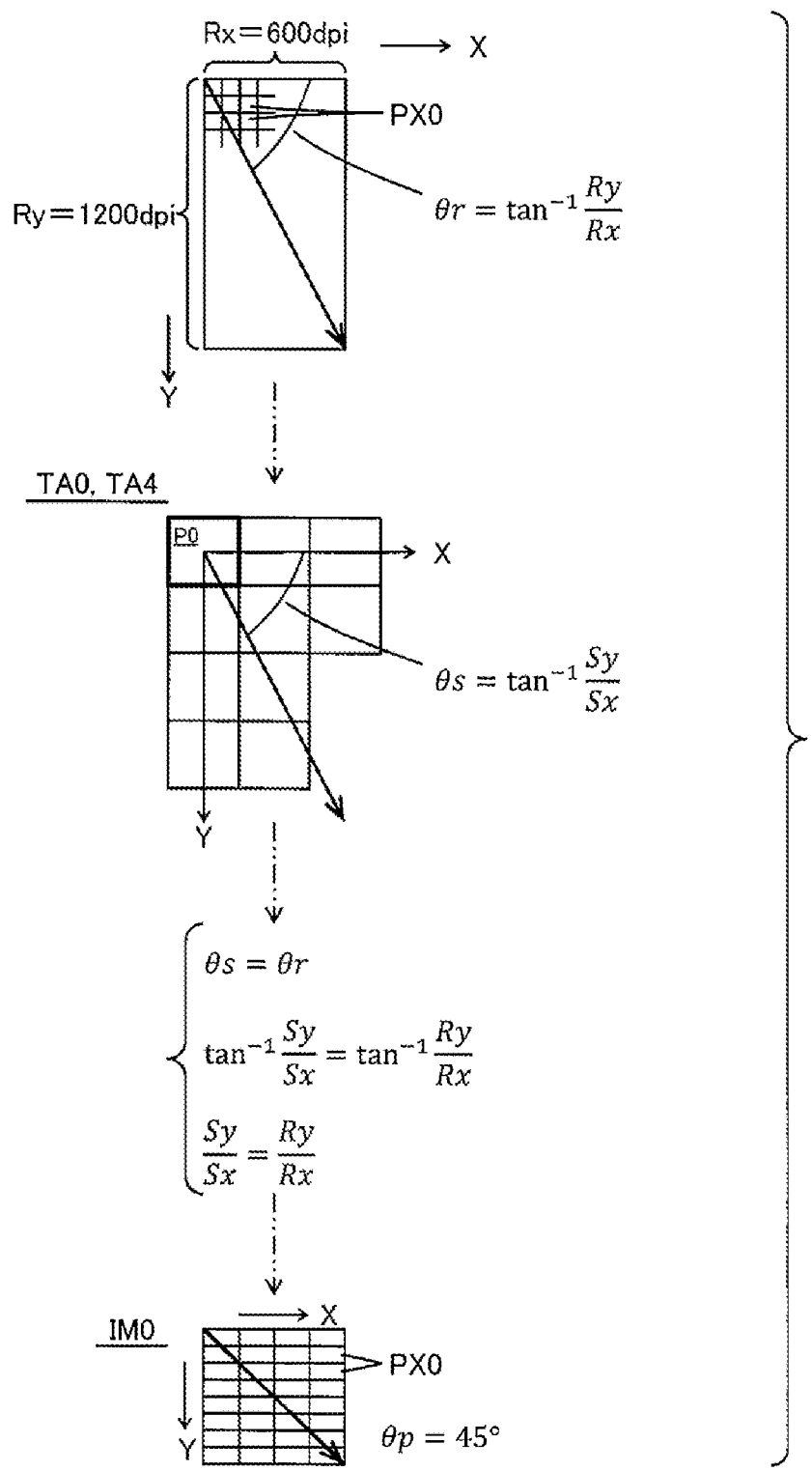
FIG. 7 is a diagram schematically illustrating an example in which the angle θs calculated from the distribution ratio table is matched with the angle θr based on the resolution ratio Ry/Rx.

As illustrated in FIGS. 5 to 7, each of the distribution ratio Ri may be set for the distribution destination pixel Qi such that the total sum ratio (Sy/Sx) matches the resolution ratio (Ry/Rx).

In the above case, the dots 38 are arranged so as to be more evenly dispersed in accordance with the resolution ratio (Ry/Rx) of an image. Thus, the aspect described above can provide a suitable example that improves image quality in terms of granularity.

Aspect 3

Figure 11:
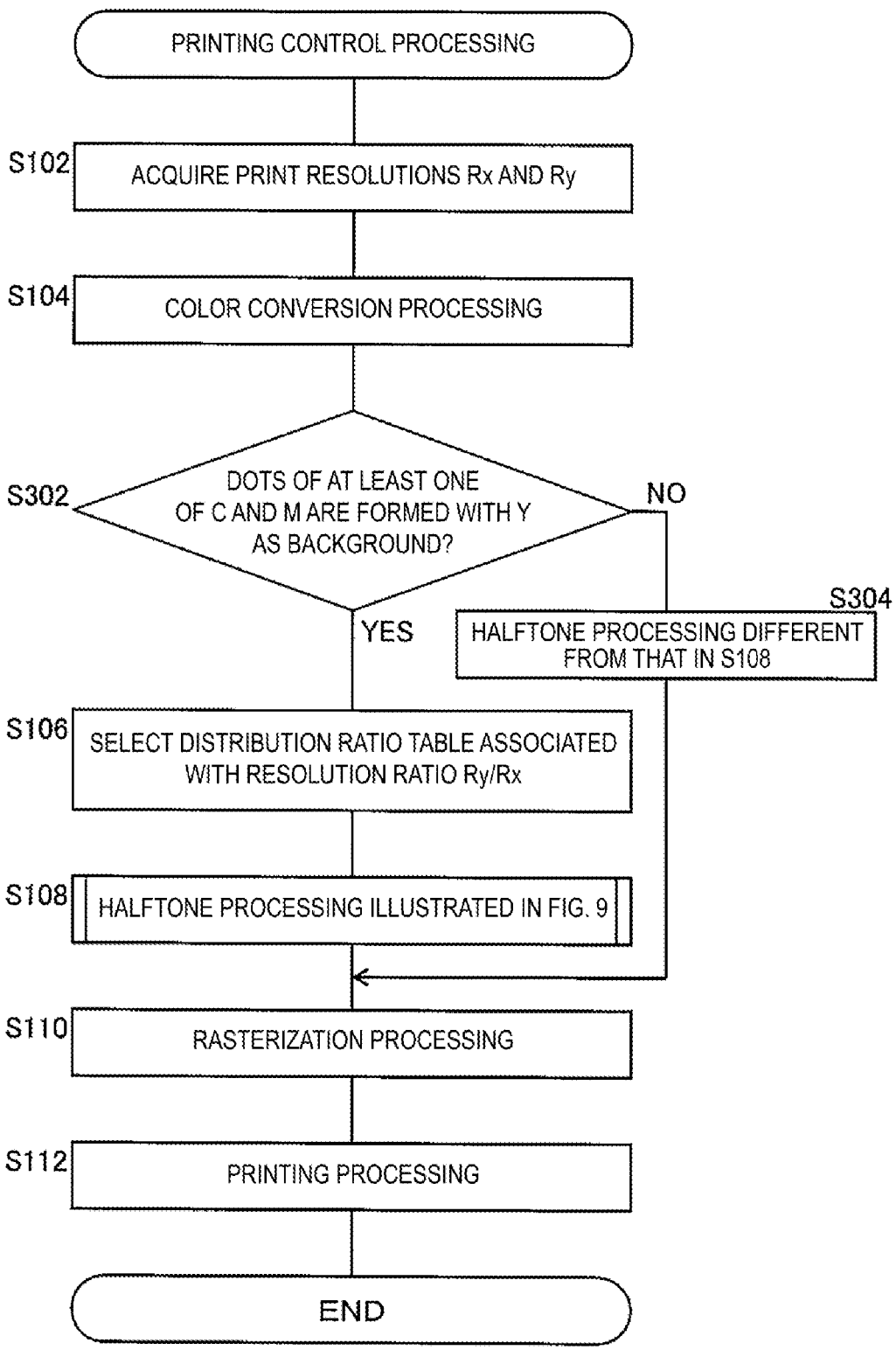
FIG. 11 is a flowchart schematically illustrating another example of the print control processing.

As illustrated in FIG. 3, the image data (DA2) may have the pixel value for at least cyan, magenta and yellow for each of the pixels PX0. As illustrated in FIG. 11, the present image processing apparatus may convert the image data (DA2) into the dot data DA3 by the error diffusion method when the dots 38 of at least one of the cyan and the magenta are formed with the yellow as a background.

When the dots 38 of at least one of cyan and magenta are sparsely formed with yellow as a background, and an arrangement of the dots 38 is biased, uncomfortable feeling may occur. In the above-described aspect, when the dots 38 of at least one of cyan and magenta are formed with yellow as a background, the dots 38 are arranged so as to be more evenly dispersed according to the resolution ratio (Ry/Rx) of an image, and thus it is possible to improve image quality of an output image.

Aspect 4

As illustrated in FIG. 5, when the first direction resolution (Rx) is greater than the second direction resolution (Ry), a range in which the plurality of distribution destination pixels Qi are arranged in the first direction may be wider than a range in which the plurality of distribution destination pixels Qi are arranged in the second direction. When the second direction resolution (Ry) is greater than the first direction resolution (Rx), the range in which the plurality of distribution destination pixels Qi are arranged in the second direction may be wider than the range in which the plurality of distribution destination pixels Qi are arranged in the first direction.

When the first direction resolution (Rx) is greater than the second direction resolution (Ry), the range in which the plurality of distribution destination pixels Qi are arranged in the first direction is wider than the range in which the plurality of distribution destination pixels Qi are arranged in the second direction, and thus a range in which an error is diffused is wider in the first direction than in the second direction. As a result, the dots 38 are arranged so as to be more evenly dispersed in accordance with the resolution ratio (Ry/Rx) of the image. On the other hand, when the second direction resolution (Ry) is greater than the first direction resolution (Rx), the range in which the plurality of distribution destination pixels Qi are arranged in the second direction is wider than the range in which the plurality of distribution destination pixels Qi are arranged in the first direction, so that the range in which an error is diffused is wider in the second direction than in the first direction. As a result, the dots 38 are arranged so as to be more evenly dispersed in accordance with the resolution ratio (Ry/Rx) of the image. Thus, the aspect described above can provide a suitable example that improves image quality in terms of granularity.

Aspect 5

Incidentally, as illustrated in FIG. 1, the printing apparatus 1 according to an aspect of the present technology includes the image processing apparatus U0 described above and a printing unit U3 that forms a print image IM0 having the first direction resolution (Rx) in the first direction and the second direction resolution (Ry) in the second direction on a medium ME0 in accordance with the dot data DA3.

As described above, the dots 38 are arranged so as to be more evenly dispersed in accordance with the resolution ratio (Ry/Rx) of the print image IM0. Therefore, the aspect described above can provide a printing apparatus that contributes to improvement of granularity in accordance with a resolution ratio of a print image.

Aspect 6

In addition, an image processing method according to an aspect of the present technology is an image processing method of converting image data (DA2) in which a first direction resolution (Rx) in a first direction and a second direction resolution (Ry) in a second direction intersecting the first direction are set into dot data DA3 representing a formation state of the dot 38 by an error diffusion method, and includes the following steps.

(A1) A conversion step ST1 of determining a formation state of the dot 38 based on the pixel value MP0 and the distributed error EP0 in the conversion target pixel P0 included in the plurality of pixels PX0 constituting the image data (DA2).

(A2) A diffusion step ST2 of diffusing the error E0 generated in the conversion target pixel P0 to the plurality of distribution destination pixels Qi in accordance with the distribution ratio Ri set for each of the plurality of distribution destination pixels Qi that are not converted.

Here, as illustrated in FIGS. 4 and 5, a total sum obtained by multiplying the distribution ratio Ri set for each of the distribution destination pixels Qi by a relative position ($\Delta$xi) of the distribution destination pixel Qi in the first direction with respect to the conversion target pixel P0 is a first direction total sum (Sx) that is not 0, a total sum obtained by multiplying the distribution ratio Ri set for each of the distribution destination pixels Qi by a relative position ($\Delta$yi) of the distribution destination pixel Qi in the second direction with respect to the conversion target pixel P0 is a second direction total sum (Sy) that is not 0, a ratio of the second direction total sum (Sy) to the first direction total sum (Sx) is a total sum ratio (Sy/Sx), a ratio of the second direction resolution (Ry) to the first direction resolution (Rx) is a resolution ratio (Ry/Rx), the total sum ratio (Sy/Sx) when the resolution ratio (Ry/Rx) is a first resolution ratio RR1 is a first total sum ratio SR1, and the total sum ratio (Sy/Sx) when the resolution ratio (Ry/Rx) is a second resolution ratio RR2 greater than the first resolution ratio RR1 is a second total sum ratio SR2. Each of the distribution ratios Ri is set for the distribution destination pixel Qi so that the second total sum ratio SR2 is greater than the first total sum ratio SR1.

As described above, the dot data DA3 in which the dots 38 are arranged so as to be more evenly dispersed in accordance with the resolution ratio (Ry/Rx) of an image is generated. Therefore, the above aspect can provide an image processing method that contributes to improvement in granularity in accordance with a resolution ratio of an image.

Further, the present technique can be applied to a printing system including the image processing apparatus described above, a method of controlling the image processing apparatus described above, a control program for the image processing apparatus described above, a control program for the printing system described above, a computer-readable recording medium in which any of the control programs described above is recorded, and the like. Further, the above-described image processing apparatus may include a plurality of separate units.

(2) Specific Example of Printing Apparatus Including Image Processing Apparatus

Figure 2:
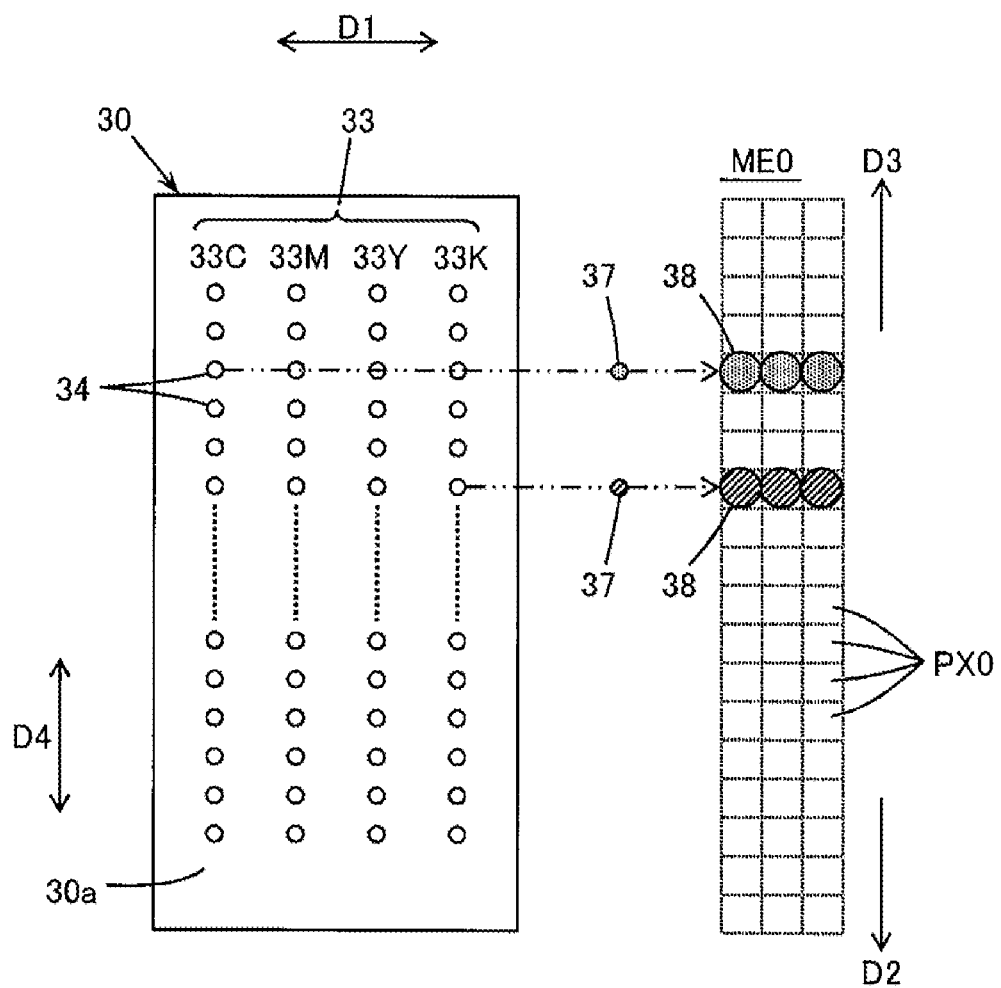
FIG. 2 is a diagram schematically illustrating an example of a nozzle surface of a printing head and a dot pattern on a medium.

FIG. 1 schematically illustrates the printing apparatus 1 including the image processing apparatus U0. Although the printing apparatus 1 of the specific example is a printer 2 itself, the printing apparatus 1 may be a combination of the printer 2 and a host device HO1. Note that the printer 2 may include additional elements not illustrated in FIG. 1. FIG. 2 schematically illustrates a nozzle surface 30a of a printing head 30 and a dot pattern on the medium ME0.

The printer 2 illustrated in FIG. 1 is a serial printer which is a type of ink jet printer. Of course, a printer to which the present technology can be applied may be a line printer having a nozzle row in which nozzles are arranged over substantially an entire width direction of a medium, an electrophotographic printer such as a laser printer in which toner as a color material is used, or the like.

The printer 2 which is an ink jet system includes a controller 10, a RAM 21 which is a semiconductor memory, a communication I/F 22, a storage unit 23, an operating panel 24, the printing head 30, a drive unit 50, and the like. RAM is an abbreviation for Random Access Memory, and I/F is an abbreviation for interface. The controller 10, the RAM 21, the communication I/F 22, the storage unit 23, and the operating panel 24 are coupled to a bus and can input/output information to/from each other.

The controller 10 includes a CPU 11 which is a processor, a color conversion unit 12, a halftone processing unit 13, a rasterization processing unit 14, a drive signal transmission unit 15, and the like. CPU is an abbreviation for Central Processing Unit. The halftone processing unit 13 is an example of the image processing apparatus U0 including the conversion unit U1 and the diffusion unit U2. The controller 10 controls main scanning and sub scanning by the drive unit 50 and discharging of ink droplets 37 by the printing head 30 based on original image data DA1 acquired from the host device HO1, a memory card (not illustrated), or the like. The original image data DA1 may be applied with, for example, RGB data having $2^8$-tone or $2^{16}$-tone integer values for R, G and B for each pixel. Here, R means red, G means green, and B means blue.

The controller 10 can be configured by a SoC or the like. SoC is an abbreviation for System on a Chip.

The CPU 11 serves as a core device in performing information processing and control in the printer 2.

The color conversion unit 12 refers to a color conversion LUT defining, for example, correspondence relationship between a tone value for R, G and B and a tone value for C, M, Y and K, and converts the RGB data into the ink amount data DA2 having a $2^8$-tone or $2^{16}$-tone integer value for C, M, Y and K for each pixel. Here, C means cyan, M means magenta, Y means yellow, K means black, and LUT is an abbreviation for look-up table. The ink amount data DA2 indicates used amounts of ink 36 of C, M, Y and K in units of pixels PX0 (see FIG. 2). Further, when resolutions of RGB data are different from output resolutions Rx and Ry (see FIG. 4), the color conversion unit 12 first converts the resolutions of the RGB data into the output resolutions Rx and Ry, or converts resolutions of the ink amount data DA2 into the output resolutions Rx and Ry. The ink amount data DA2 having the output resolutions Rx and Ry is an example of image data in which the output resolutions Rx and Ry are set.

The halftone processing unit 13 performs halftone processing by an error diffusion method on a tone value of each pixel PX0 constituting the ink amount data DA2, to reduce the number of tones of the tone value and generate the dot data DA3. The dot data DA3 represents a formation state of the dot 38 in units of pixels PX0. The dot data DA3 may be binary data indicating whether a dot is formed, or may be three-or-more-tone multivalued data that can support dots of different sizes such as small, medium, and large.

The rasterization processing unit 14 generates raster data RA0 by performing rasterization processing of rearranging the dot data DA3 in an order in which the dots 38 are formed by the drive unit 50.

The drive signal transmission unit 15 uses the raster data RA0 to generate a drive signal SG1 corresponding to a voltage signal to be applied to a drive element 32 of the printing head 30, and outputs the drive signal SG1 to a drive circuit 31 of the printing head 30. For example, when the raster data RA0 corresponds to "dot formation", the drive signal transmission unit 15 outputs the drive signal SG1 for discharging ink droplets for forming dots. When the raster data RA0 is four-valued data, the drive signal transmission unit 15 outputs the drive signal SG1 for discharging ink droplets for a large dot when the raster data RA0 corresponds to "large dot formation", outputs the drive signal SG1 for discharging ink droplets for a medium dot when the raster data RA0 corresponds to "medium dot formation", and outputs the drive signal SG1 for discharging ink droplets for a small dot when the raster data RA0 corresponds to "small dot formation".

Note that when the printer 2 is a line printer, the rasterization processing unit 14 need not be present at the controller 10, and the drive signal transmission unit 15 may generate the drive signal SG1 from the dot data DA3.

The components 11 to 15 described above may each be formed by an ASIC that directly reads processing target data from the RAM 21 and directly writes the processed data to the RAM 21. Here, the ASIC is an abbreviation for "Application Specific Integrated Circuit".

The drive unit 50 controlled by the controller 10 includes a carriage drive unit 51 and a roller drive unit 55. In the drive unit 50, the carriage drive unit 51 drives a carriage 52 to move back and forth along a main scanning direction D1, and sends the medium ME0 by driving of the roller drive unit 55 in a send direction D3 along a transport path 59. As illustrated in FIG. 2, the main scanning direction D1 is a direction intersecting an arrangement direction D4 of nozzles 34, and is a direction orthogonal to the arrangement direction D4, for example. The send direction D3 is a direction intersecting the main scanning direction D1, and is a direction orthogonal to the main scanning direction D1, for example. In FIG. 1, the send direction D3 is a direction toward the right side. Thus, the left side and the right side thereof are respectively referred to as an upstream side and a downstream side. A sub scanning direction D2 illustrated in FIG. 2 is a direction opposite to the send direction D3. The carriage drive unit 51 reciprocates the carriage 52 along the main scanning direction D1 in accordance with the control of the controller 10. It can be said that the carriage drive unit 51 performs the main scanning in which a relative positional relationship between the printing head 30 and the medium ME0 is changed along the main scanning direction D1. The roller drive unit 55 includes a transport roller pair 56 and a discharge roller pair 57. Under the control by the controller 10, the roller drive unit 55 performs the sub scanning for sending the medium ME0 in the send direction D3, by rotating a driving transport roller of the transport roller pair 56 and a driving discharge roller of the discharge roller pair 57. It can be said that the roller drive unit 55 performs the sub scanning in which a relative positional relationship between the printing head 30 and the medium ME0 is changed along the sub scanning direction D2 intersecting the main scanning direction D1. The medium ME0 is a material holding a print image thereon, and is formed of paper, resin, metal, or the like. The material of the medium ME0 is not particularly limited, and various materials such as resin, metal, and paper may be used. A shape of the medium ME0 is also not particularly limited, and may be various shapes such as a rectangular shape and a roll shape, and may even be a three-dimensional shape.

The carriage 52 is mounted with the printing head 30. The carriage 52 may be mounted with an ink cartridge 35 from which the ink 36 to be discharged as the ink droplets 37 is supplied to the printing head 30. Of course, the ink 36 may be supplied to the printing head 30 through a tube from the ink cartridge 35 installed outside the carriage 52. The carriage 52 is fixed to an endless belt (not illustrated), and is capable of moving in the main scanning direction D1 along a guide 53. The guide 53 is an elongated member with a longitudinal direction extending along the main scanning direction D1. The carriage drive unit 51 is configured with a servomotor, and reciprocates the carriage 52 along the main scanning direction D1 in accordance with an instruction from the controller 10.

The transport roller pair 56 upstream of the printing head 30 sends the medium ME0 nipped therebetween toward the printing head 30 by rotation of the driving transport roller, during the sub scanning. The discharge roller pair 57 downstream of the printing head 30 transports the medium ME0 nipped therebetween toward a medium discharge unit (not illustrated), by rotation of the driving discharge roller, during the sub scanning. The roller drive unit 55 is configured with a servomotor, and operates the transport roller pair 56 and the discharge roller pair 57 to send the medium ME0 in the send direction D3, in accordance with an instruction from the controller 10.

A platen 58 is on a lower side of the transport path 59, and supports the medium ME0 on the transport path 59, by being in contact with the medium ME0. The printing head 30 controlled by the controller 10 discharges the ink droplets 37 toward the medium ME0 supported by the platen 58. Thus, the ink 36 adheres to the medium ME0.

The printing head 30 including the drive circuit 31, the drive element 32, and the like includes the nozzle surface 30a provided with the plurality of nozzles 34 that discharge the ink droplets 37, and discharges the ink droplets 37 onto the medium ME0 on the platen 58, to perform printing. Here, the nozzle row is a row of a plurality of nozzles that are each a small hole through which the ink droplets are ejected. The nozzle surface 30a is a surface from which the ink droplets 37 are discharged. The drive circuit 31 applies a voltage signal to the drive element 32 in accordance with the drive signal SG1 input from the drive signal transmission unit 15. The drive element 32 may be a piezoelectric element that applies pressure to the ink 36 in a pressure chamber in communication with the nozzles 34, a drive element that produces bubbles in the pressure chamber using heat to discharge the ink droplets 37 from the nozzles 34, and the like. The pressure chamber of the printing head 30 is supplied with the ink 36 from the ink cartridge 35. The drive element 32 makes the ink 36 in the pressure chamber discharged as the ink droplets 37 onto the medium ME0, from the nozzles 34. As a result, the dot 38 of the ink droplets 37 is formed on the medium ME0. Formation of the dot 38 according to the raster data RA0 while the printing head 30 moves in the main scanning direction D1, and sending the medium ME0 in the send direction D3 for the sub scanning performed once are repeated to form the print image IM0 on the medium ME0.

The controller 10 including the rasterization processing unit 14 and the drive signal transmission unit 15, the printing head 30, and the drive unit 50 are an example of the printing unit U3 that forms the print image IM0 with the output resolutions Rx and Ry on the medium ME0 in accordance with the dot data DA3.

The RAM 21 stores the original image data DA1 and the like received from the host device HO1, a memory (not illustrated), or the like. The communication I/F 22 is coupled to the host device HO1 wirelessly or using a wire, and inputs/outputs information from/to the host device HO1.

The host device HO1 includes a computer such as a personal computer and a tablet terminal, a mobile phone such as a smart phone, a digital camera, a digital video camera, and the like. The storage unit 23 may be a nonvolatile semiconductor memory such as a flash memory, a magnetic storage device such as a hard disk, or the like. The operating panel 24 includes an output unit 25 such as a liquid crystal panel that displays information, an input unit 26 such as a touch panel that receives an operation on a display screen, and the like.

The printing head 30 illustrated in FIG. 2 includes a plurality of nozzle rows 33 each including the plurality of nozzles 34 arranged in the arrangement direction D4 at a predetermined interval, that is, a nozzle pitch, at the nozzle surface 30a. The plurality of nozzle rows 33 include a cyan nozzle row 33C for discharging the ink droplets 37 corresponding to C, a magenta nozzle row 33M for discharging the ink droplets 37 corresponding to M, a yellow nozzle row 33Y for discharging the ink droplets 37 corresponding to Y, and a black nozzle row 33K for discharging the ink droplets 37 corresponding to K. Each ink droplet 37 is discharged from the nozzle 34 targeting the pixel ME0 of the medium PX0. Of course, the dot 38 corresponding to C is formed on the medium ME0 from the ink droplets 37 corresponding to C, the dot 38 corresponding to M is formed on the medium ME0 from the ink droplets 37 corresponding to M, the dot 38 corresponding to Y is formed on the medium ME0 from the ink droplets 37 corresponding to Y, and the dot 38 corresponding to K is formed on the medium ME0 from the ink droplets 37 corresponding to K. Each of the nozzle rows 33 discharges the ink droplets 37 toward the medium ME0. The plurality of nozzles 34 included in each nozzle row 33 may be arranged in a single row, or may be arranged in a staggered manner, that is, in two rows.

FIG. 3 schematically illustrates the halftone processing performed by the halftone processing unit 13 that converts the ink amount data DA2 into the dot data DA3. In FIG. 3, each pixel PX0 of the ink amount data DA2 and the dot data DA3 is indicated by a square, and the conversion target pixel P0 is indicated by a thick line. When the ink amount data DA2 is 256-tone, the ink amount data DA2 has a tone value $C_{256}$ for C, a tone value $M_{256}$ for M, a tone value $Y_{256}$ for Y, and a tone value $K_{256}$ for K for each pixel PX0. The dot data DA3 has a dot value $C_d$ for C, a dot value $M_d$ for M, a dot value $Y_d$ for Y, and a dot value $K_d$ for K for each pixel PX0. In the conversion target pixel P0, the pixel value MP0 of the conversion target pixel P0 is illustrated in an upper row, and the generated error E0 is illustrated in a lower row. In a plurality of distribution destination pixels Q1 to Q6 to which the error E0 is distributed in accordance with distribution ratios R1 to R6, pixel values M1 to M6 of the distribution destination pixels Q1 to Q6 are illustrated in upper rows, and errors E1 to E6 distributed from the conversion target pixel P0 are illustrated in lower rows. Here, the distribution destination pixels Q1 to Q6 are collectively referred to as a distribution destination pixel Qi, the distribution ratios R1 to R6 are collectively referred to as a distribution ratio Ri, the pixel values M1 to M6 are collectively referred to as a pixel value Mi (not illustrated), and the errors E1 to E6 are collectively referred to as an error Ei. In a converted pixel PX2, a tone value based on the 256-tone ink amount data DA2 is illustrated as a tone value corresponding to a dot value, for convenience.

The ink amount data DA2 and the dot data DA3 include the plurality of pixels PX0 arranged orderly in the X direction, which is a horizontal direction in FIG. 3, and in the Y direction, which is a vertical direction in FIG. 3. Here, the X direction is an example of the first direction, and the Y direction is an example of the second direction. The X direction and the Y direction intersect each other, and are orthogonal to each other in FIG. 3. In FIG. 3, it is assumed that the origin of XY coordinates is located in the upper left, an X coordinate closer to a right side is larger, and a Y coordinate closer to a lower side is larger. As an arrow illustrated in an upper part of FIG. 3, the conversion target pixel P0 is first set at an origin pixel at an upper left corner and then set at pixels up to a pixel at an upper right corner in an ascending order of the X coordinates, then is moved downward by one row, set at a pixel at left end and then set at pixels up to a pixel at a right end in an ascending order of the X coordinates, this setting order is repeated and ends with a pixel at a lower right corner. According to this setting order, the converted pixels PX2 are upper pixels each having a smaller Y coordinate than that of the conversion target pixel P0, and left pixels each having the same Y coordinate as that of the conversion target pixel P0 and a smaller X coordinate than that of the conversion target pixel P0. Further, unconverted pixels PX1 are right pixels each having the same Y coordinate as the conversion target pixel P0 and an X coordinate greater than that of the conversion target pixel P0, and lower pixels each having a Y coordinate greater than that of the conversion target pixel P0. The distribution destination pixel Qi is selected from the unconverted pixels PX1 existing on either the right side or the lower side of the conversion target pixel P0.

Note that since the ink amount data DA2 is prepared for each color, the dot data DA3 is generated for each color. For example, when the ink amount data DA2 is prepared for C, M, Y and K, the dot data DA3 is generated for C, M, Y and K.

The conversion unit U1 included in the halftone processing unit 13 determines a formation state of the dot 38 in the conversion target pixel P0 based on the pixel value MP0 and the distributed error EP0. For example, when the dot data DA3 is binary data representing whether the dot 38 is formed, the conversion unit U1 determines a dot value of the conversion target pixel P0 to be 0 corresponding to "no dot" or 1 corresponding to "dot formation". In FIG. 3, a 256-tone value 0 corresponding to the dot value 0, or a 256-tone value 255 corresponding to the dot value 1 is illustrated in each converted pixel PX2.

The diffusion unit U2 included in the halftone processing unit 13 calculates the error E0 associated with the dot value determination in the conversion target pixel P0, and diffuses the generated error E0 to the plurality of distribution destination pixels Qi in accordance with the distribution ratios Ri respectively set for the plurality of distribution destination pixels Qi that are not converted. The diffusion unit U2 determines the error Ei to be distributed to each distribution destination pixel Qi by multiplying the error E0 by the distribution ratio Ri determined from a distribution ratio table TA0 illustrated in a lower part of FIG. 3. For example, in the distribution ratio table TA0 illustrated in FIG. 3, based on the conversion target pixel P0, a weight of 4 is assigned to each of the distribution destination pixels Q1 and Q4, a weight of 3 is assigned to the distribution destination pixel Q2, a weight of 2 is assigned to each of the distribution destination pixels Q3 and Q5, and a weight of 1 is assigned to the distribution destination pixel Q6. Since a total of the weights assigned to the distribution destination pixels Q1 to Q6 is 16, each of the distribution ratios R1 and R4 is 4/16, the distribution ratio R2 is 3/16, each of the distribution ratios R3 and R5 is 2/16, and the distribution ratio R6 is 1/16.

Note that since the error distributed to each distribution destination pixel Qi may be derived from the plurality of converted pixels PX2, errors other than the errors E1 to E6 illustrated in FIG. 3 may be included.

As illustrated in FIG. 4, the resolutions Rx and Ry may be set for the print image IM0 in various ways. FIG. 4 schematically illustrates the various resolutions for the print image IM0. Here, the resolution Rx in the X direction is an example of a first direction resolution in the first direction, the resolution Ry in the Y direction is an example of a second direction resolution in the second direction, and the resolution ratio Ry/Rx is an example of a ratio of the second direction resolution to the first direction resolution.

For example, when the resolution Rx is 2400 dpi, this means that the plurality of pixels PX0 included in the print image IM0 are arranged at a density of 2400 pixels per inch in the X direction. When the resolution Ry is 600 dpi, this means that the plurality of pixels PX0 included in the print image IM0 are arranged at a density of 600 pixels per inch in the Y direction. Therefore, when Rx×Ry=2400×600 dpi, on the print image IM0, an interval between the pixels PX0 in the X direction is 1/4 of an interval between the pixels PX0 in the Y direction, and the interval between the pixels PX0 in the X direction is different from the interval between the pixels PX0 in the Y direction. Conversely, when Rx×Ry=600×2400 dpi, on the print image IM0, the interval between the pixels PX0 in the X direction is four times the interval between the pixels PX0 in the Y direction, and the interval between the pixels PX0 in the X direction is different from the interval between the pixels PX0 in the Y direction. Of course, when both the resolutions Rx and Ry are 600 dpi, the interval between the pixels PX0 in the X direction and the interval between the pixels PX0 in the Y direction are the same.

When the halftone processing by the error diffusion method was performed in accordance with a common distribution ratio table for the various resolution ratios Ry/Rx, it was found that bias occurs in a dot arrangement depending on the resolution ratio Ry/Rx. For example, when a print image in which the resolution Ry in the Y direction is different from the resolution Rx in the X direction is formed using a distribution ratio table designed on the assumption of Ry=Rx, an undesired sequence of dots called a worm occurred in a low-tone portion in some cases. As described above, depending on the resolution ratio Ry/Rx, bias occurs in the dot arrangement, and particularly in a low-tone portion in a print image, the bias may appear as a decrease in granularity.

In the specific example, by switching the distribution ratio table TA0 in accordance with the resolution ratio Ry/Rx, the dots 38 are more evenly dispersed, and image quality of the print image IM0 is improved in terms of granularity.

Note that for convenience of description, one of the resolution ratios Ry/Rx at a plurality of stages is referred to as a first resolution ratio RR1, and a resolution ratio greater than the first resolution ratio RR1 is referred to as a second resolution ratio RR2. FIG. 4 illustrates that Ry/Rx=1/4 is applied to the first resolution ratio RR1 and Ry/Rx=1/2 is applied to the second resolution ratio RR2. Of course, since the first resolution ratio RR1 and the second resolution ratio RR2 can be applied in various ways, for example, Ry/Rx=1/2 may be applied to the first resolution ratio RR1 and Ry/Rx=1 may be applied to the second resolution ratio RR2.

FIG. 5 schematically illustrates the distribution ratio table TA0 in accordance with the resolution ratio Ry/Rx. As illustrated in FIG. 5, the distribution ratio table TA0 that depends on the resolution ratio Ry/Rx is prepared. The controller 10 illustrated in FIG. 1 holds a plurality of the distribution ratio tables TA0 corresponding to the resolution ratios Ry/Rx. FIG. 5 illustrates distribution ratio tables TA1, TA2, TA3, TA4 and TA5 associated with resolution ratios 1/4, 1/2, 1, 2 and 4, respectively. Each distribution ratio table TA0 has a value representing the distribution ratio Ri assigned to the distribution destination pixel Qi with respect to the conversion target pixel P0. For example, the distribution ratio table TA1 has values 3, 2, 2, 2, 1, 1, 1, 3, 1 in an order for i=1 to 9, where i is a variable for identifying the n=9 distribution destination pixels Qi. Since a total sum of these values is 16, the distribution ratios Ri are 3/16, 2/16, 2/16, 2/16, 1/16, 1/16, 1/16, 3/16, 1/16 in an order for i=1 to 9.

Here, a total sum obtained by adding up a product of the distribution ratio Ri set for each distribution destination pixel Qi and a relative position $\Delta xi$ of the distribution destination pixel Qi in the X direction with respect to the conversion target pixel P0 for all i is a first direction total sum Sx. Further, a total sum obtained by adding up a product of the distribution ratio Ri set for each distribution destination pixel Qi and a relative position $\Delta yi$ of the distribution destination pixel Qi in the Y direction with respect to the conversion target pixel P0 for all i is a second direction total sum Sy. The total sums Sx and Sy are expressed by the following equations.

[Math. 1]
$$Sx = \sum_{i=1}^{n}(Ri \times \Delta xi) \quad (1)$$
$$Sy = \sum_{i=1}^{n}(Ri \times \Delta yi) \quad (2)$$

Each distribution ratio Ri is set such that Sx>0 and Sy>0.

For example, in the distribution ratio table TA1, the first direction total sum Sx and the second direction total sum Sy are as follows.

$Sx=(3\times1+2\times2+2\times3+2\times4+1\times5-1\times2-1\times1+3\times0+1\times1)/16=24/16$ $Sy=(3\times0+2\times0+2\times0+2\times0+1\times0+1\times1+1\times1+3\times1+1\times1)/16=6/16$ Further, a ratio of the second direction total sum Sy to the first direction total sum Sx is a total sum ratio Sy/Sx. In each distribution ratio table TA0, each distribution ratio Ri is set for the distribution destination pixel Qi so that the total sum ratio Sy/Sx coincides with the resolution ratio Ry/Rx.

For example, the total sum ratio Sy/Sx in the distribution ratio table TA1 is 1/4, which coincides with the resolution ratio Ry/Rx=1/4. The total sum ratio Sy/Sx in the distribution ratio table TA2 is 1/2, which coincides with the resolution ratio Ry/Rx=1/2. The total sum ratio Sy/Sx in the distribution ratio table TA3 is 1, which coincides with the resolution ratio Ry/Rx=1. The total sum ratio Sy/Sx in the distribution ratio table TA4 is 2, which coincides with the resolution ratio Ry/Rx=2. The total sum ratio Sy/Sx in the distribution ratio table TA5 is 4, which coincides with the resolution ratio Ry/Rx=4.

In addition, the total sum ratio Sy/Sx when the resolution ratio Ry/Rx is the first resolution ratio RR1 is the first total sum ratio SR1, and the total sum ratio Sy/Sx when the resolution ratio Ry/Rx is the second resolution ratio RR2 greater than the first resolution ratio RR1 is the second total sum ratio SR2. For example, as illustrated in FIG. 4, it is assumed that the resolution ratio Ry/Rx=1/4 is applied to the first resolution ratio RR1 and the resolution ratio Ry/Rx=1/2 is applied to the second resolution ratio RR2. In this case, as illustrated in FIG. 5, the total sum ratio Sy/Sx=1/4 is applied to the first total sum ratio SR1, and the total sum ratio Sy/Sx=1/2 is applied to the second total sum ratio SR2. Each distribution ratio Ri is set for the distribution destination pixel Qi so that the second total sum ratio SR2 is greater than the first total sum ratio SR1. Of course, since the first total sum ratio SR1 and the second total sum ratio SR2 can be applied in various ways, for example, Sy/Sx=Ry/Rx=1/2 may be applied to the first total sum ratio SR1, and Sy/Sx=Ry/Rx=1 may be applied to the second total sum ratio SR2.

As illustrated in FIGS. 6 and 7, matching the total sum ratio Sy/Sx with the resolution ratio Ry/Rx is equivalent to matching an angle $\theta s=\tan^{-1}(Sy/Sx)$ based on the total sum ratio Sy/Sx with an angle $\theta r=\tan^{-1}(Ry/Rx)$ based on the resolution ratio Ry/Rx. FIG. 6 schematically illustrates an example in which the angle $\theta s$ calculated from the distribution ratio table TA2 associated with the resolution ratio Ry/Rx=1/2 is matched with the angle $\theta r$ based on the resolution ratio Ry/Rx. FIG. 7 schematically illustrates an example in which the angle $\theta s$ calculated from the distribution ratio table TA4 associated with the resolution ratio Ry/Rx=2 is matched with the angle $\theta r$ based on the resolution ratio Ry/Rx.

The angle $\theta r$ based on the resolution ratio Ry/Rx means an internal angle of a right triangle in which a length of an adjacent side is the resolution Rx and a length of an opposite side is the resolution Ry, and is represented by an arctangent value of the resolution ratio Ry/Rx.

$$\theta r = \tan^{-1}(Ry/Rx) \quad (3)$$

In the example illustrated in FIG. 4, the angle $\theta r$ when the resolution ratio Ry/Rx is 1/4 is 14.04°, the angle $\theta r$ when the resolution ratio Ry/Rx is 1/2 is 26.57°, the angle $\theta r$ when the resolution ratio Ry/Rx is 1 is 45.00°, the angle $\theta r$ when the resolution ratio Ry/Rx is 2 is 63.43°, and the angle $\theta r$ when the resolution ratio Ry/Rx is 2 is 75.96.

The angle $\theta s$ based on the total sum ratio Sy/Sx means an internal angle of a right triangle in which a length of an adjacent side is the first direction total sum Sx and a length of an opposite side is the second direction total sum Sy, and is represented by an arctangent value of the sum ratio Sy/Sx.

$$\theta s = \tan^{-1}(Sy/Sx)) \quad (4)$$

In the example illustrated in FIG. 5, the angle $\theta s$ when the total sum ratio Sy/Sx is 1/4 is 14.04°, the angle $\theta s$ when the total sum ratio Sy/Sx is 1/2 is 26.57°, the angle $\theta s$ when the total sum ratio Sy/Sx is 1 is 45.00°, the angle $\theta s$ when the total sum ratio Sy/Sx is 2 is 63.43°, and the angle $\theta s$ when the sum ratio Sy/Sx is 2 is 75.96°.

When the angle $\theta s$ is equal to the angle $\theta r$, the following relationship holds.

$$\tan^{-1}(Sy/Sx) = \tan^{-1}(Ry/Rx)) \quad (5)$$

$$Sy/Sx = Ry/Rx) \quad (6)$$

Therefore, matching the angle $\theta s$ with the angle $\theta r$ is equivalent to matching the total sum ratio Sy/Sx with the resolution ratio Ry/Rx.

As illustrated in FIG. 6, when the resolution ratio Ry/Rx is 1/2, a length of the pixels PX0 for Rx pieces in the X direction is equal to a length of the pixels PX0 for Ry pieces in the Y direction in the print image IM0. Therefore, in the print image IM0, an internal angle θp of a right triangle in which a length of an adjacent side is the length of the pixels PX0 for the Rx pieces and a length of an opposite side is the length of the pixels PX0 for the Ry pieces is 45°. Therefore, the halftone processing by the error diffusion method is performed so that the dots 38 are evenly dispersed in both the X direction and the Y direction in accordance with the resolution ratio Ry/Rx in the print image IM0.

As illustrated in FIG. 7, also when the resolution ratio Ry/Rx is 2, the length of the pixels PX0 for the Rx pieces in the X direction is equal to the length of the pixels PX0 for the Ry pieces in the Y direction in the print image IM0. Therefore, in the print image IM0, an internal angle θp of a right triangle in which a length of an adjacent side is the length of the pixels PX0 for the Rx pieces and a length of an opposite side is the length of the pixels PX0 for the Ry pieces is 45°. Thus, the halftone processing by the error diffusion method is performed so that the dots 38 are evenly dispersed in both the X direction and the Y direction in accordance with the resolution ratio Ry/Rx in the print image IM0.

Further, when the resolution Rx in the X direction is greater than the resolution Ry in the Y direction as in the distribution ratio tables TA1 and TA2 illustrated in FIG. 5, a range in which the plurality of distribution destination pixels Qi are arranged in the X direction is wider than a range in which the plurality of distribution destination pixels Qi are arranged in the Y direction. As a result, a range in which an error is diffused is wider in the X direction than in the Y direction, and the halftone processing by the error diffusion method is performed so that the dots 38 are more evenly dispersed in both the X direction and the Y direction in accordance with the resolution ratio Ry/Rx in the print image IM0.

On the other hand, when the resolution Ry in the Y direction is greater than the resolution Rx in the X direction as in the distribution ratio tables TA4 and TA5 illustrated in FIG. 5, a range in which the plurality of distribution destination pixels Qi are arranged in the Y direction is wider than a range in which the plurality of distribution destination pixels Qi are arranged in the X direction. As a result, a range in which an error is diffused is wider in the Y direction than in the X direction, and the halftone processing by the error diffusion method is performed so that the dots 38 are more evenly dispersed in both the X direction and the Y direction in accordance with the resolution ratio Ry/Rx in the print image IM0.

Note that when the resolution Rx in the X direction is equal to the resolution Ry in the Y direction as in the distribution ratio table TA3 illustrated in FIG. 5, a range in which the plurality of distribution destination pixels Qi are arranged in the X direction may be equal to a range in which the plurality of distribution destination pixels Qi are arranged in the Y direction. In this case, the halftone processing by the error diffusion method is performed so that the dots 38 are evenly dispersed in both the X direction and the Y direction in accordance with the resolution ratio Ry/Rx=1 in the print image IM0.

Figure 8:
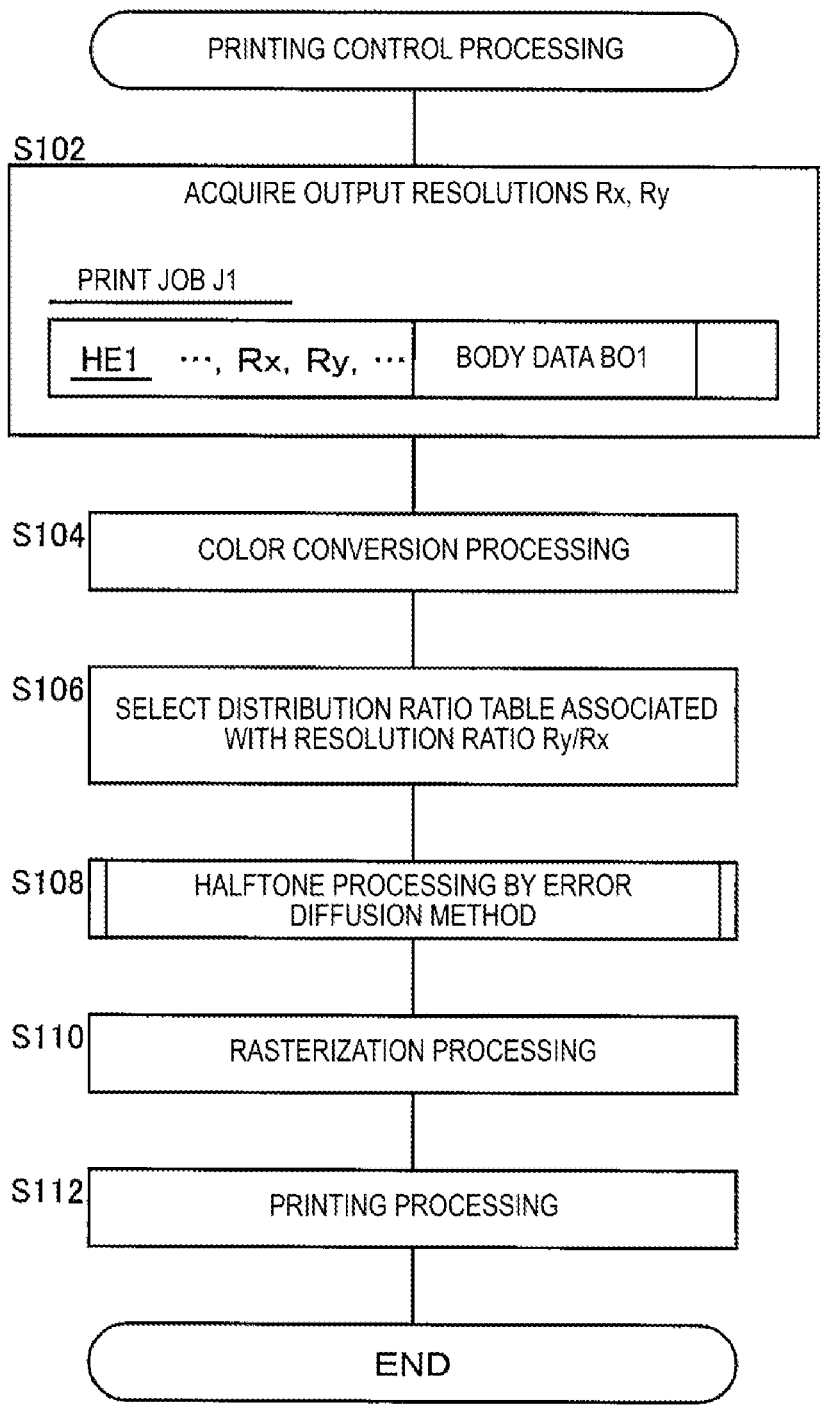
FIG. 8 is a flowchart schematically illustrating an example of print control processing.

(3) Specific Example of Print Control Processing Including Halftone Processing by Error Diffusion Method FIG. 8 schematically illustrates print control processing including halftone processing by an error diffusion method. The print control processing illustrated in FIG. 8 is performed by the controller 10 illustrated in FIG. 1. For example, when receiving a print job J1 serving as the original image data DA1 from the host device HO1, the controller 10 starts the print control processing. The print job J1 is stored in, for example, the RAM 21. FIG. 9 schematically illustrates the halftone processing performed by the controller 10. Here, steps S204 to S206 correspond to the conversion unit U1 and the conversion step ST1, and steps S208 to S210 correspond to the diffusion unit U2 and a diffusion step ST2. In the following description, the term "step" may be omitted, and a reference numeral corresponding to a step may be written in parentheses. Further, the description below is given by also referring to FIGS. 1 to 7.

The print job J1 includes a header HE1, a body data BO1, and the like. The header HE1 includes printing resolutions Rx and Ry. The body data BO1 corresponds to the original image data DA1, and may be the original image data DA1 itself, for example, RGB data in a bitmap format, or may be a drawing data that is converted into the original image data DA1 by interpretation.

When the print control processing starts, the controller 10 acquires the printing resolutions Rx and Ry from the print job J1 (S102). Note that the controller 10 may acquire the printing resolutions Rx and Ry by receiving setting of the printing resolutions Rx and Ry with the operating panel 24. In this case, the controller 10 may acquire the original image data DA1 from a memory card (not illustrated) or the like.

After acquiring the printing resolutions Rx and Ry, the controller 10 acquires the original image data DA1 from the print job J1, the memory card, or the like, and when resolutions of the original image data DA1 are different from the printing resolutions Rx and Ry, converts the resolutions of the original image data DA1 into the printing resolutions Rx and Ry. Then, the controller 10 performs color conversion processing of converting the original image data DA1 into the ink amount data DA2 in the color conversion unit 12 (S104). When the original image data DA1 is RGB data and the ink amount data DA2 is CMK data having a 256-tone pixel value for, example, C, M, Y and K, the controller 10 performs known color conversion processing of converting the RGB data into the CMYK data.

After the color conversion processing, the controller 10 selects a distribution ratio table associated with the resolution ratio Ry/Rx from among the plurality of distribution ratio tables TA0 in the halftone processing unit 13 (S106). For example, when the controller 10 holds the distribution ratio tables TA1 to TA5 illustrated in FIG. 5, a distribution ratio table having the distribution ratio Ri that leads to the total sum ratio Sy/Sx matching the resolution ratio Ry/Rx is selected from among the plurality of distribution ratio tables TA0. Here, it is assumed that the second resolution ratio RR2 is greater than the first resolution ratio RR1, the first total sum ratio SR1 corresponds to the first resolution ratio RR1, and the second total sum ratio SR2 corresponds to the second resolution ratio RR2. When the resolution ratio Ry/Rx is the first resolution ratio RR1, the distribution ratio table TA0 that leads to the first total sum ratio SR1 is selected, and when the resolution ratio Ry/Rx is the second resolution ratio RR2, the distribution ratio table TA0 that leads to the second total sum ratio SR2 greater than the first total sum ratio SR1 is selected. In the examples illustrated in FIGS. 4 and 5, when the resolution ratio Ry/Rx is 1/4, the distribution ratio table TA1 that leads to the total sum ratio Sy/Sx of 1/4 is selected, and when the resolution ratio Ry/Rx is 1/2, the distribution ratio table TA2 that leads to the total sum ratio Sy/Sx of 1/2 is selected.

After selecting the distribution ratio table TA0, the controller 10 performs the halftone processing by the error diffusion method in the halftone processing unit 13 (S108).

FIG. 9 illustrates the halftone processing performed in S108. The halftone processing illustrated in FIG. 9 is performed for each of the colors C, M, Y and K.

When the halftone processing is started, the halftone processing unit 13 sets a position of the conversion target pixel P0 as illustrated in FIG. 3 (S202). The processing in S202 can be said to be processing of selecting a target pixel of conversion for reducing the number of tones from among the plurality of pixels PX0 constituting the ink amount data DA2.

After setting the position of the conversion target pixel P0, the halftone processing unit 13 calculates a correction value CP0 by adding the received error EP0 to the pixel value MP0 in the conversion target pixel P0 (S204). The received error EP0 is an error distributed to the conversion target pixel P0, and when errors are distributed from a plurality of pixels, the received error EP0 is a total of the distributed errors.

After calculating the correction value CP0, the halftone processing unit 13 compares the correction value CP0 with a threshold value TH0, and determines a dot value D0 representing a formation state of the dot 38 in the conversion target pixel P0 based on a result of the comparison (S206).

For example, it is assumed that the pixel value MP0 is a tone value from 0 to 255, the dot value DT0 is a binary value of 0 or 1, and the threshold value TH0 is greater than 1 and less than 255. When the correction value CP0 is equal to or greater than the threshold value TH0, the halftone processing unit 13 can determine the dot value DT0 to be 1, which means "dot formation". When the corrected value CP0 is less than the threshold value TH0, the halftone processing unit 13 can determine the dot value DT0 to be 0 which means "no dot". As described above, the conversion unit U1 determines the formation state of the dot 38 based on the pixel value MP0 and the distributed error EP0 in the conversion target pixel P0 included in the plurality of pixels PX0 constituting the ink amount data DA2.

In addition, the halftone processing unit 13 calculates the error E0 generated along with the determination of the dot value DT0 (S208). In the above-described example, when the dot value DT0 is determined to be 1, the halftone processing unit 13 can determine a value obtained by subtracting 255 from the correction value CP0 to be the error E0. When the dot value DT0 is determined to be 0, the halftone processing unit 13 can determine the correction value CP0 to be the error E0.

After calculating the error E0, the halftone processing unit 13 diffuses the error Ei to each distribution destination pixel Qi according to the distribution ratio table TA0 selected in accordance with the resolution ratio Ry/Rx (S210). The halftone processing unit 13 determines the error Ei to be distributed to each distribution destination pixel Qi by multiplying the error E0 by the distribution ratio Ri determined from the distribution ratio table TA0 illustrated in the lower part of FIG. 3.

As described above, the diffusion unit U2 diffuses the error E0 generated in the conversion target pixel P0, in accordance with the distribution ratio Ri set for each of the plurality of distribution destination pixels Qi that are not converted, to the plurality of distribution destination pixels Qi.

After the diffusion of the error Ei, the halftone processing unit 13 determines whether the processing from S202 to S210 are performed with all the pixels P0 included in the ink amount data DA2 as the conversion target pixels P0 or not (S212). When the unconverted pixel PX1 remains as illustrated in FIG. 3, the halftone processing unit 13 repeats the processing from S202 to S212. When the unconverted pixel PX1 does not remain, the halftone processing unit 13 ends the halftone processing illustrated in FIG. 9. Accordingly, the dot data DA3 having the dot value DT0 representing the formation state of the dot 38 in each pixel PX0 is obtained.

Note that the dot value DT0 may have three or more values. For example, when the dot value DT0 may have four values, a first threshold value greater than 0 and less than 253 (referred to as TH1), a second threshold value greater than the first threshold value TH1 and less than 254 (referred to as TH2), and a third threshold value greater than the second threshold value TH2 and less than 255 (referred to as TH3) may be prepared. When the correction value CP0 is equal to or greater than the threshold value TH3, the halftone processing unit 13 may determine the dot value DT0 to be 3, which means "large dot formation", and may determine a value obtained by subtracting, for example, 255 from the correction value CP0 to be the error E0. When the correction value CP0 is equal to or greater than the threshold value TH2 and less than the threshold value TH3, the halftone processing unit 13 may determine the dot value DT0 to be 2, which means "medium dot formation", and may determine a value obtained by subtracting, for example, 128 from the correction value CP0 to be the error E0. When the correction value CP0 is equal to or greater than the threshold value TH1 and less than the threshold value TH2, the halftone processing unit 13 may determine the dot value DT0 to be 1, which means "small dot formation", and may determine a value obtained by subtracting, for example, 64 from the correction value CP0 to be the error E0. When the correction value CP0 is less than the threshold value TH1, the halftone processing unit 13 may determine the dot value DT0 to be 0, which means "no dot", and may determine the correction value CP0 to be the error E0.

After the halftone processing illustrated in FIG. 9, the controller 10 generates the raster data RA0 by performing rasterization processing in which the dot data DA3 is rearranged in an order in which the dots 38 are formed by the drive unit 50, in the rasterization processing unit 14 (S110). Note that the rasterization processing is optional processing, and is not performed when the printer 2 is a line printer, for example.

After the rasterization processing, the controller 10 generates the drive signal SG1 corresponding to a voltage signal applied to the drive element 32 from the raster data RA0 in the drive signal transmission unit 15, and outputs the drive signal SG1 to the drive circuit 31 of the printing head 30 (S112). As a result, the printer 2 forms the print image IM0 having the output resolutions Rx and Ry on the medium ME0 in accordance with the dot data DA3 by driving the printing head 30 and the drive unit 50. When the rasterization processing in S110 is not performed, the controller 10 may generate the drive signal SG1 corresponding to the voltage signal applied to the drive element 32 from the dot data DA3 in the drive signal transmission unit 15, and output the drive signal SG1 to the drive circuit 31 of the printing head 30. After the processing in S112, the controller 10 ends the print control processing.

(4) Actions and Effects According to Specific Example

Figure 10:
FIG. 10 is a diagram schematically illustrating an example in which dots are arranged so as to be evenly dispersed by bringing a total sum ratio calculated from a distribution ratio close to a resolution ratio.

FIG. 10 schematically illustrates an example in which the dots 38 are arranged so as to be evenly dispersed by bringing the total sum ratio Sy/Sx calculated from the distribution ratio Ri close to the resolution ratio Ry/Rx. FIG. 10 schematically illustrates partial dot arrangements 111, 112, 121 and 122 that may appear in a low-tone portion in a print image according to the resolution ratio Ry/Rx and the total sum ratio Sy/Sx. Of course, an actual dot arrangement is not necessarily the dot arrangement 111, 112, 121 or 122 illustrates in FIG. 10.

When the resolution ratio Ry/Rx is 1/4 and the resolution Rx in the X direction is greater than the resolution Ry in the Y direction, and the total sum ratio Sy/Sx is 1 and weights of the distribution ratio Ri are the same in the X direction and the Y direction, a dot arrangement may be biased as in the dot arrangement 111, for example. A bias in a dot arrangement in a low-tone portion may appear as undesired sequence of dots called a worm.

Here, when halftone processing by a dither method is performed on a low-tone portion of an image using a Bayer mask that achieves a regular dot arrangement, a periodic pattern is necessarily generated in some tones. Since such a periodic pattern is conspicuous, image quality of a print image is deteriorated. When halftone processing by a dither method is performed on a low-tone portion of an image using a dither mask in which threshold values are arranged so as to exclude a tone that leads to a periodic pattern, a tone property is not secured.

In the specific example, an even dot arrangement in both the X direction and the Y direction is achieved by bringing the total sum ratio Sy/Sx in the distribution ratio table TA0 close to the resolution ratio Ry/Rx while ensuring a tone property by performing the halftone processing by the error diffusion method.

For example, when the resolution ratio Ry/Rx is 1/4 and the total sum ratio Sy/Sx is matched with 1/4, the dots are evenly dispersed in both the X direction and the Y direction as in the dot arrangement 112. Therefore, the print image IM0 with high quality in which a tone property and an even dot arrangement are compatible is formed.

When the resolution ratio Ry/Rx is 4 and the resolution Ry in the Y direction is greater than the resolution Rx in the X direction, and the total sum ratio Sy/Sx is 1 and weights of the distribution ratio Ri are the same in the X direction and the Y direction, a dot arrangement may be biased as in the dot arrangement 121, for example. A bias in a dot arrangement in a low-tone portion may appear as undesired sequence of dots called a worm.

For example, when the resolution ratio Ry/Rx is 4 and the total sum ratio Sy/Sx is matched with 4, the dots are evenly dispersed in both the X direction and the Y direction as in the dot arrangement 122. Therefore, the print image IM0 with high quality in which a tone property and an even dot arrangement are compatible is formed.

As described above, even when the resolution Rx in the X direction and the resolution Ry in the Y direction are different from each other, the dots 38 are arranged so as to be evenly dispersed in both the X direction and the Y direction. Therefore, the specific example can improve quality of the print image IM0 in terms of granularity particularly in a low-tone portion, and can contribute to improvement of granularity in accordance with the resolution ratio Ry/Rx of the print image IM0.

(5) Modified Examples

Various modification examples of the present disclosure are conceivable.

For example, types of color materials forming a print image on a medium are not limited to C, M, Y and K, and may include, in addition to C, M, Y and K, orange, green, light cyan with a lower density than C, light magenta with a lower density than M, dark yellow with a higher density than Y, light black with a lower density than K, a colorless color material for image quality improvement, and the like. In addition, the present technique is applicable also to a case where some of color materials of C, M, Y and K are not used.

The entity that performs the above-described processing is not limited to the CPU, and may be an electronic component other than the CPU, such as an ASIC. Naturally, a plurality of CPUs may perform the above-described processing in cooperation, or a CPU and another electronic component (for example, an ASIC) may perform the above-described processing in cooperation.

The above-described processing can be appropriately changed, for example, reordered. For example, in the print control processing illustrated in FIG. 8, the distribution ratio table selection processing in S106 can be performed immediately before the color conversion processing in S104.

A part of the above-described processing may be performed by the host device HO1. In this case, a combination of the controller 10 and the host device HO1 is an example of the printing apparatus 1. When the host device HO1 performs halftone processing by an error diffusion method, the host device HO1 is an example of the image processing apparatus U0.

Although the total sum ratio Sy/Sx is matched with the resolution ratio Ry/Rx in the above-described specific example, the total sum ratio Sy/Sx may be deviated from the resolution ratio Ry/Rx as long as the relationship between the resolution ratio (RR1, RR2) and the total sum ratio (SR1, SR2) is satisfied. For example, it is assumed that the first resolution ratio RR1 is 1/4 and the second resolution ratio RR2 is 1/2. In this case, the first total sum ratio SR1 may be 11/40 increased by 10% and the second total sum ratio may be 11/20 increased by 10%, or the first total sum ratio SR1 may be 9/40 decreased by 10% and the second total sum ratio may be 9/20 decreased by 10%. Of course, the degree of increase or decrease can be changed in various ways such as 15% increase, 5% increase, 5% decrease, 15% decrease, and the like. The same applies to a case where the first resolution ratio RR1 is 1/2 and the second resolution ratio RR2 is 1, a case where the first resolution ratio RR1 is 1 and the second resolution ratio RR2 is 2, a case where the first resolution ratio RR1 is 2 and the second resolution ratio RR2 is 4, and the like.

Incidentally, in a low-tone portion of the print image IM0, graininess of the dots 38 is more noticeable when the dots 38 are formed in a plurality of colors and bleeding occurs than when the dots 38 are formed in a single color. In particular, when the dots 38 of at least one of C and M are sparsely formed with Y as a background, and the arrangement of the dots 38 is biased, uncomfortable feeling may occur. Therefore, the halftone processing by the error diffusion method described above may be performed only when the dots 38 of at least one of C and M are sparsely formed with Y as a background.

FIG. 11 schematically illustrates another example of the print control processing performed by the controller 10 illustrated in FIG. 1. Note that in the print control processing illustrated in FIG. 11, a portion where the same processing as that in the print control processing illustrated in FIG. 8 is performed is denoted by the reference numeral illustrated in FIG. 8, and detailed description thereof is omitted.

When the print control processing illustrated in FIG. 11 is started, the controller 10 acquires the printing resolutions Rx and Ry (S102), and performs color conversion processing for converting the original image data DA1 into the ink amount data DA2 (S104). The ink amount data DA2 has a pixel value for C, M, Y and K for each pixel PX0. Here, it is sufficient that the ink amount data DA2 has at least a pixel value for C, M and Y for each pixel PX0, and a pixel value for K need not be included.

After the color conversion processing, the controller 10 determines whether to form the dots 38 of at least one of C and M with Y as a background or not in the halftone processing unit 13 based on the ink amount data DA2 (S302). For example, it is assumed that the pixel value of the ink amount data DA2 is a tone value from 0 to 255, and a threshold value (referred to as THY) for determining the background of Y is greater than 128 and less than 255. Further, it is assumed that a threshold value (referred to as THZ) for determining that the dots 38 other than Y are sparsely formed is greater than 0 and less than 127. That is, 0<THZ<THY<255. When there is a pixel for which a pixel value of Y is equal to or greater than the threshold value THY and a pixel value of at least one of C and M is equal to or less than the threshold value THZ in the plurality of pixels PX0 constituting the ink amount data DA2, the controller 10 can determine that the condition is satisfied in the S302. On the other hand, when there is no pixel for which a pixel value of Y is equal to or greater than the threshold value THY and a pixel value of at least one of C and M is equal to or less than the threshold value THZ in the plurality of pixels PX0 constituting the ink amount data DA2, the controller 10 can determine that the condition is not satisfied in the S302.

When determining that the condition is satisfied in S302, the controller 10 selects the distribution ratio table TAO associated with the resolution ratio Ry/Rx in the halftone processing unit 13 (S106), and performs the halftone processing by the error diffusion method illustrated in FIG. 9 (S108). On the other hand, when determining that the condition is not satisfied in the S302, the controller 10 performs halftone processing different from that in S108, for example, halftone processing by a dither method in the halftone processing unit 13 (S304).

After the halftone processing in S108 or the halftone processing in S304, the controller 10 performs optional rasterization processing (S110) and outputs the drive signal SG1 to the drive circuit 31 of the printing head 30 (S112). As a result, the printer 2 forms the print image IM0 having the output resolutions Rx and Ry on the medium ME0 in accordance with the dot data DA3 by driving the printing head 30 and the drive unit 50.

In the example illustrated in FIG. 11, when the dots 38 of at least one of C and M are formed with y as a background, the dots 38 are arranged so as to be more evenly dispersed in accordance with the resolution ratio Ry/Rx of the print image IM0, so that image quality of the print image IM0 can be improved.

Note that even when Ry>Rx and a range in which the plurality of distribution destination pixels Qi are arranged in the Y direction is not wider than a range in which the plurality of distribution destination pixels Qi are arranged in the X direction, a basic effect that contributes to improvement of granularity in accordance with the resolution ratio Ry/Rx of an image is obtained.

Even when Rx>Ry and the range in which the plurality of distribution destination pixels Qi are arranged in the X direction is not wider than the range in which the plurality of distribution destination pixels Qi are arranged in the Y direction, a basic effect that contributes to improvement of granularity in accordance with the resolution ratio Ry/Rx of an image is obtained.

(6) Conclusion

As described above, according to various aspects of the present disclosure, it is possible to provide a technique or the like that contributes to improvement of granularity in accordance with a resolution ratio of an image. Naturally, even technology including only the components recited in the independent claims produces the above-described basic actions and effects.

Furthermore, the aspects of the present disclosure can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the present disclosure include these configurations and the like.

What is claimed is:

1. A printing apparatus comprising:
an image processing; and
a print head,
the image processing apparatus being configured to convert digital image data, in which a first direction resolution in a first direction and a second direction resolution in a second direction intersecting the first direction are set, into digital dot data representing a dot formation state by an error diffusion method, the image processing apparatus including
a controller configured to
determine the dot formation state based on a pixel value and a distributed error in a conversion target pixel included in a plurality of pixels constituting the digital image data, and
diffuse an error generated in the conversion target pixel to a plurality of distribution destination pixels that are not converted,
the controller holding a plurality of distribution ratio tables in each of which
a total sum obtained by multiplying a distribution ratio set for each of the distribution destination pixels by a relative position of the distribution destination pixel in the first direction with respect to the conversion target pixel is a first direction total sum, and the first direction total sum is not 0,
a total sum obtained by multiplying the distribution ratio set for each of the distribution destination pixels by a relative position of the distribution destination pixel in the second direction with respect to the conversion target pixel is a second direction total sum, and the second direction total sum is not 0, and
a ratio of the second direction total sum to the first direction total sum is a total sum ratio,
the plurality of distribution ratio tables including at least a first distribution ratio table and a second distribution ratio table,
a first total sum ratio for the first distribution ratio table being the total sum ratio for a first resolution ratio that is one of resolution ratios which are settable for the digital image data and each of which indicates a ratio of the second direction resolution to the first direction resolution, a second total sum ratio for the second distribution ratio table being the total sum ratio for a second resolution ratio that is a different one of the resolution ratios and is greater than the first resolution ratio, and the second total sum ratio for the second distribution ratio table being greater than the first total sum ratio for the first distribution ratio table, and the controller being configured to diffuse the error in accordance with one of the distribution ratio tables that is selected from the distribution ratio tables based on a resolution ratio of the digital image data that is a ratio of the second direction resolution to the first direction resolution, and the print head being configured to form a print image having the first direction resolution in the first direction and the second direction resolution in the second direction on a medium in accordance with the digital dot data.

2. The printing apparatus according to claim 1, wherein the distribution ratio is set for the distribution destination pixel so that the total sum ratio matches the resolution ratio.

3. The printing apparatus according to claim 1, wherein the digital image data includes the pixel value for at least cyan, magenta and yellow for each of the pixels, and the digital image data is converted into the digital dot data by the error diffusion method when the dot of at least one of the cyan and the magenta is formed with the yellow as a background.

4. The printing apparatus according to claim 1, wherein in a distribution ratio table, among the plurality of distribution ratio tables, in which the first direction resolution is greater than the second direction resolution, a range in which the plurality of distribution destination pixels are arranged in the first direction is wider than a range in which the plurality of distribution destination pixels are arranged in the second direction, and in a distribution ratio table, among the plurality of distribution ratio tables, in which the second direction resolution is greater than the first direction resolution, the range in which the plurality of distribution destination pixels are arranged in the second direction is wider than the range in which the plurality of distribution destination pixels are arranged in the first direction.

5. A printing method and an image processing method of converting digital image data, in which a first direction resolution in a first direction and a second direction resolution in a second direction intersecting the first direction are set, into digital dot data representing a dot formation state by an error diffusion method, the image processing method comprising:

determining, by a controller, the dot formation state based on a pixel value and a distributed error in a conversion target pixel included in a plurality of pixels constituting the digital image data;

diffusing, by the controller, an error generated in the conversion target pixel to a plurality of distribution destination pixels that are not converted; and forming, at a print head, a print image having the first direction resolution in the first direction and the second direction resolution in the second direction on a medium in accordance with the digital dot data, the controller holding a plurality of distribution ratio tables in each of which a total sum obtained by multiplying a distribution ratio set for each of the distribution destination pixels by a relative position of the distribution destination pixel in the first direction with respect to the conversion target pixel is a first direction total sum, and the first direction total sum is not 0, a total sum obtained by multiplying the distribution ratio set for each of the distribution destination pixels by a relative position of the distribution destination pixel in the second direction with respect to the conversion target pixel is a second direction total sum, and the second direction total sum is not 0, and a ratio of the second direction total sum to the first direction total sum is a total sum ratio, the plurality of distribution ratio tables including at least a first distribution ratio table and a second distribution ratio table, a first total sum ratio for the first distribution ratio table being the total sum ratio for a first resolution ratio that is one of resolution ratios which are settable for the digital image data and each of which indicates a ratio of the second direction resolution to the first direction resolution, a second total sum ratio for the second distribution ratio table being the total sum ratio for a second resolution ratio that is a different one of the resolution ratios and is greater than the first resolution ratio, and the second total sum ratio for the second distribution ratio table being greater than the first total sum ratio for the first distribution ratio table, and the diffusing of the error being performed in accordance with one of the distribution ratio tables that is selected from the distribution ratio tables based on a resolution ratio of the digital image data that is a ratio of the second direction resolution to the first direction resolution.

* * * * *